United States Patent [19]

Grimmer

[11] Patent Number: 5,774,552

[45] Date of Patent: Jun. 30, 1998

[54] METHOD AND APPARATUS FOR RETRIEVING X.509 CERTIFICATES FROM AN X.500 DIRECTORY

[75] Inventor: Francine Gail Grimmer, Poway, Calif.

[73] Assignee: NCR Corporation, Dayton, Ohio

[21] Appl. No.: 572,261

[22] Filed: Dec. 13, 1995

[51] Int. Cl.[6] .................................................. H04L 9/00
[52] U.S. Cl. ................................ 380/25; 380/49
[58] Field of Search ....................... 380/25, 49

[56] References Cited

U.S. PATENT DOCUMENTS

| | | | |
|---|---|---|---|
| 5,220,604 | 6/1993 | Gasser et al. | 380/25 |
| 5,222,140 | 6/1993 | Beller et al. | 380/49 |
| 5,313,598 | 5/1994 | Yamakawa | 395/601 |
| 5,315,657 | 5/1994 | Abadi et al. | 380/25 |
| 5,659,616 | 8/1997 | Sudia | 380/25 |

OTHER PUBLICATIONS

International Standards Organization, "Information Technology—Open Systems Interconnection—The Directory—Part 8: Authentication Framework", ISO/IEC 9594–8:1990 (E).

*Primary Examiner*—Salvatore Cangialosi
*Attorney, Agent, or Firm*—Merchant, Gould, Smith, Edell, Welter & Schmidt

[57] ABSTRACT

A method and apparatus for retrieving, verifying, and using information accessible by a directory service agent to authenticate electronic messages is described. The method comprises the steps of transmitting an open connection message to establish communication between a directory user agent and a directory service agent, searching a directory in the directory service agent for authentication certificates, fetching the found authentication certificates, and transmitting the fetched authentication certificates to the directory user agent. In one embodiment of the invention, the method also comprises the step of searching the directory for authentication certificates responsive to a search criteria message in the open connection message.

32 Claims, 11 Drawing Sheets

METHOD AND APPARATUS FOR RETRIEVING X.509 CERTIFICATES FROM AN X.500 DIRECTORY

BACKGROUND OF THE INVENTION

1. Field of the Invention

The present invention relates generally to methods for securing transmission and receipt of electronic data, and in particular, a method and apparatus for retrieving X.509 certificates from an X.500 directory service agent.

2. Description of Related Art

In recent years, the use of E-mail and other electronic communication and message transfer methods have become widespread. While these communication methods have numerous advantages, they are vulnerable to tampering. Customers sending electronic messages want to be certain their messages are not opened or disclosed to unauthorized persons. Further, customers receiving electronic messages want to be certain of the identity of the sender and that the messages were not tampered with at some point during transmission. Many methods have been developed to secure the integrity of electronic messages during transmission. Simple encryption is the most common method of securing data. Both private key encryption such as DES (Data Encryption Standard) and public key encryption methods are implemented.

Although public and private key encryption methods allow users to send E-mail messages without concern that the message will be read by an unauthorized person or that its contents will be tampered with, key cryptographic methods alone do not protect the receiver of the message. That is, they do not allow the recipient to authenticate the validity of the public key or to validate the identity of the sender of the electronic message.

As described herein, one method for validating the authenticity of a public key is the use of digital certificates. A certificate is a signed document attesting to the identity and public key of the person signing the message. The certificate prevents impersonation using a phony key pair. However, certificate authentication requires global access to a centralized, secure repository for storing authentication certificates. This invention satisfies this need by providing a method and apparatus for retrieving authentication certificates from a secure, centralized repository.

SUMMARY OF THE INVENTION

To overcome the limitations in the prior art described above, and to overcome other limitations that will become apparent upon reading and understanding the present specification, the present invention discloses a method and apparatus for retrieving authenticating information from a directory accessible by a directory service agent.

The method comprises the steps of transmitting an open connection message to establish communication between the directory user agent and the directory service agent, searching the directory for authentication certificates, fetching the authentication certificates, and transmitting the fetched authentication certificates to the directory user agent. In one embodiment, the method also comprises the step of searching the directory for authentication certificates responsive to a search criteria message in the open connection message.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is understood that other embodiments may be utilized and structural changes may be made without departing from the scope of the present invention.

1. Overview a. Encryption Techniques

The most common method of securing the contents of data, whether in transport or storage, is encryption. Encryption is the transformation of plaintext data into an unintelligible form known as ciphertext. Encryption is usually accomplished by the application of mathematical algorithms on the plaintext data. These algorithms are defined by parameters known as "keys." Two common encryption methods are symmetric methods which use private keys, and asymmetric methods which use public keys.

Figure 1:
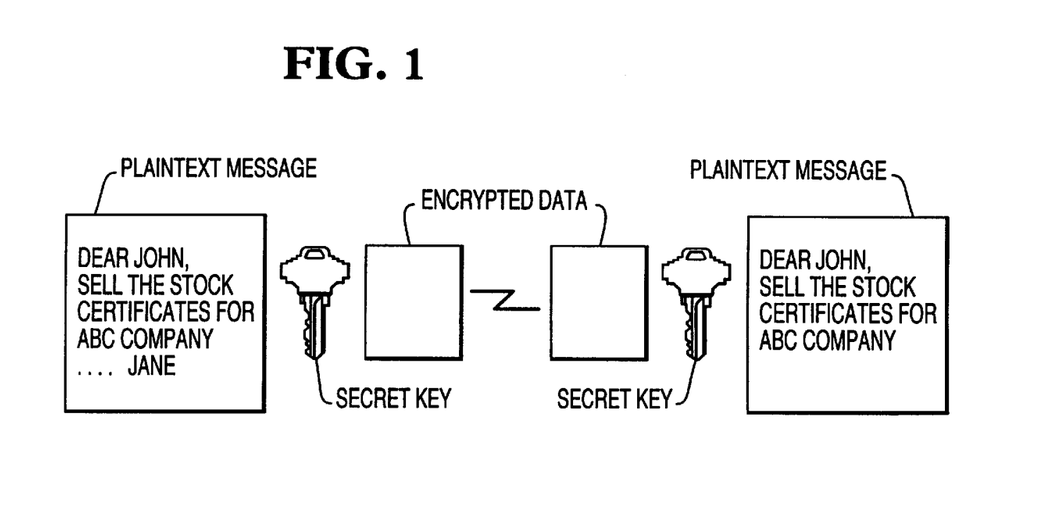
FIG. 1 illustrates private key encryption techniques.

With private key encryption, both encryption and decryption are performed using the same key, as shown in FIG. 1. Both the sender and the receiver must know the key in order to encrypt and decrypt data exchanged from each other. Exchanging this secret key between the sender and the receiver can pose security risk. The Data Encryption Standard (DES) is one implementation of private key encryption.

Public key encryption relies on a pair of keys, a public key and a private key. Each user's public key is published in a public key file or imbedded in certificates in the X.500 directory, while the private key is kept secret. The message is encrypted using the recipient's public key and sent across the insecure communications channel. The message is then decrypted by the recipient using their private key.

An advantage of public key cryptography over private key cryptography is increased security, because private keys need not be transmitted or revealed to anyone. Another advantage of public key cryptography is that it can provide a simple method to create digital signatures. Authentication using only private key cryptography requires the sharing of the secret key, which raises the danger of compromise or forgery.

Figure 2:
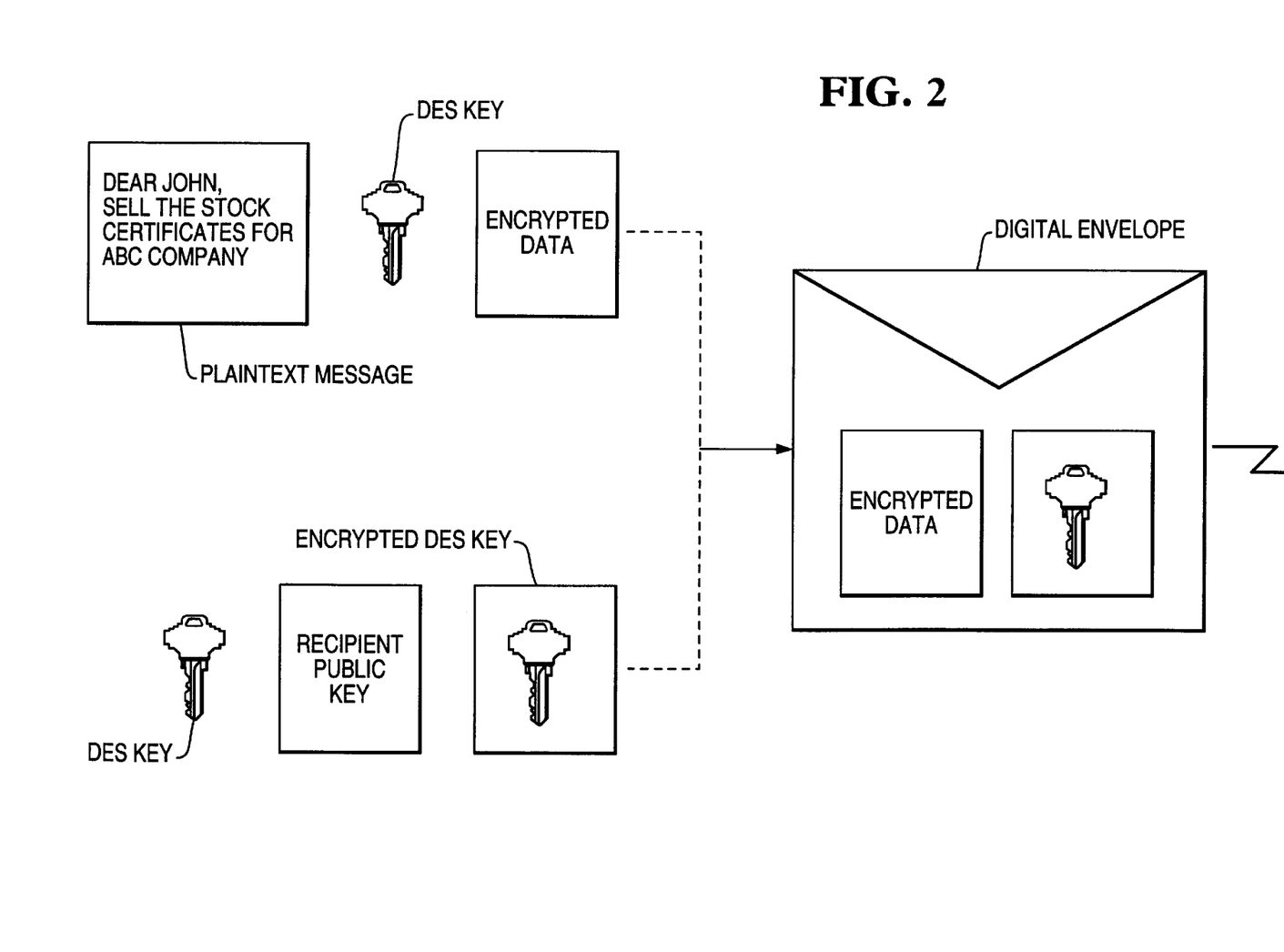
FIG. 2 illustrates a method of providing secure communications using RSA in conjunction with DES.

RSA encryption, named after its M.I.T. inventors Rivest, Shamir, and Adleman, is one example of a public key encryption implementation. RSA can be used in conjunction with DES to establish and provide a secure communication connection, as shown in FIG. 2. First the message is encrypted with a random DES key, and before being transmitted, the DES key is encrypted with the recipient's (or multiple recipients') public key(s). Both the encrypted message and the encrypted key are sent to the recipient as a digital envelope. When the envelope arrives at the destination, the recipient opens it using the associated private key to decrypt the DES key, and then decrypts the message using the newly acquired DES key. In this manner, RSA and DES are combined to gain the performance advantages of private key encryption and the key management features of RSA.

b. Authentication Techniques

Authentication allows for the verification that someone or something is valid or genuine. Digital signature authentication allows the receiver of the message to be confident of the identity of the sender and/or the integrity of the message. The digital signature is an unforgeable set of data declaring that the named person wrote or otherwise agreed to the document to which the digital signature is attached. Normally, the digital signature is appended to the end of the message. A digital signature can be used for both message and sender authentication. In message authentication, the digital signature is used to verify that the received message was not tampered with, somewhat like a checksum. In sender authentication, a digital signature is used to verify the identity of the originator of a message. Thus, a secure digital signature system provides both a method of signing a document to preclude forgery, and a method of verifying that a signature was actually generated by whomever it represents. A secure digital signature cannot be repudiated; the sender cannot later disown the message by claiming it was forged.

Figure 3:
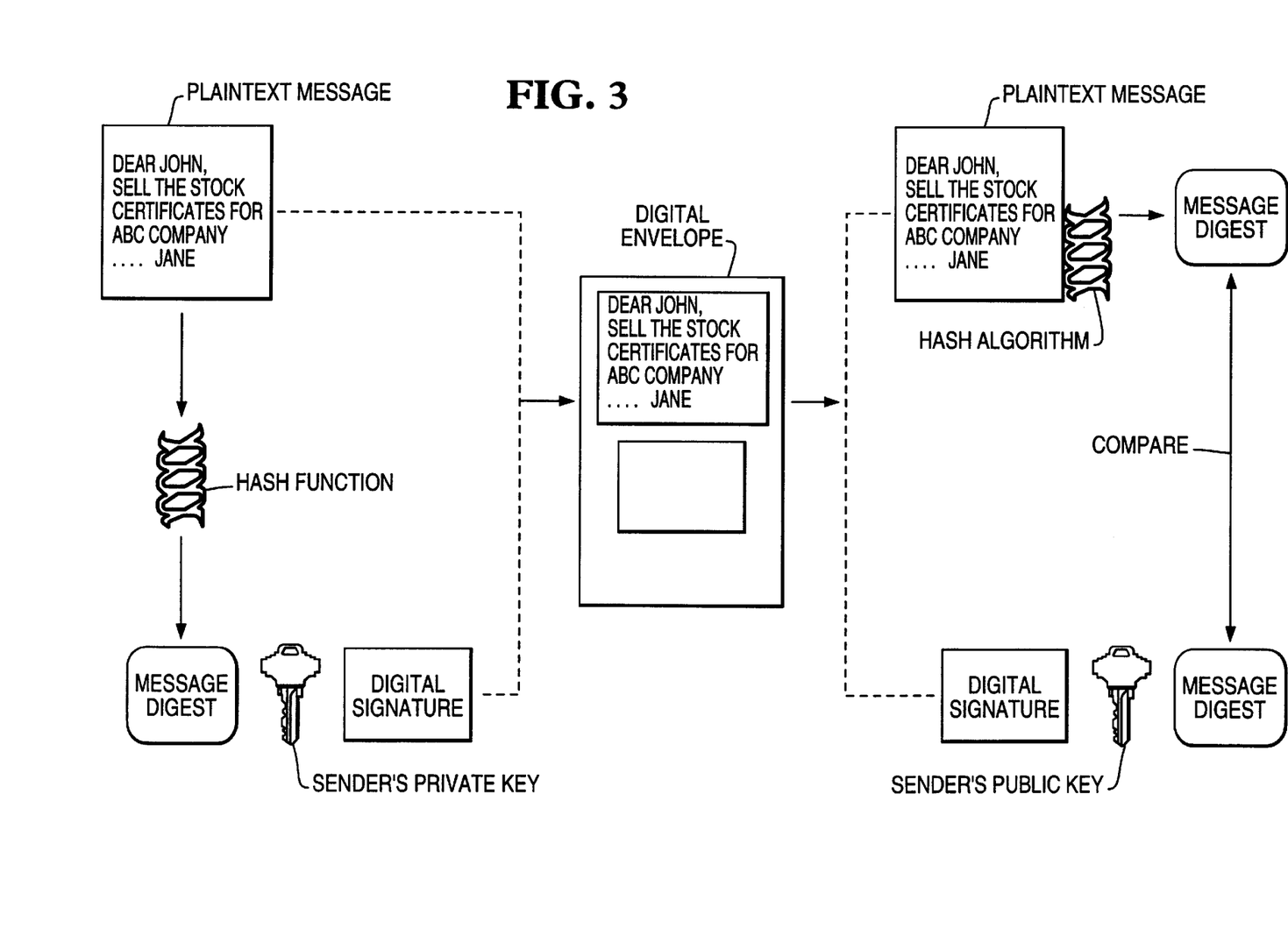
FIG. 3 illustrates the digital signature process.

The digital signature process is shown in FIG. 3. The sender uses a one-way hash function typically SHA (Secure Hash Algorithm), MD (Message Digest)2, or MD5 to scramble the message data bits. The hash function produces a "fingerprint" or "message digest." The message digest is then encrypted in the sender's private key, and sent along with the plaintext message to the recipient. The recipient separates the encrypted digest from the plaintext and computes the digest again on the plaintext. The encrypted digest is decrypted using the sender's public key and compared against the newly created digest. If they match, the recipient has positively identified the sender. The message digest becomes the "checksum" to validate the integrity of the data and the digital signature is the authentication that the message is from who it says it is from.

With this implementation, the sender's private key is used to create a digital signature, and the sender's public key is used to decrypt it. On the receiving side, the application will automatically look up the sender's public key, decrypt the digital signature, and return confirmation of the source of the message. Also, if both encryption and digital signature techniques are to be used, the message is first encrypted using RSA then signed using a digital signature. Then, the encrypted data and digital signature would be sent across to the recipient. The recipient would decrypt the encrypted data, then validate the digital signature.

c. Authentication Using X.509 Digital Certificates

Digital signatures can be used to guarantee the validity of the public key. These digital signatures can be incorporated into a certificate, thereby creating a "signed" document containing a digital signature attesting to the validity and public key of the person signing the message, and preventing one user from impersonating another by using a phony key pair. Along with the public key, the certificate also contains the expiration date of the key, the name of the issuer of the certificate, the certificate serial number, and the digital signature of certificate issuer. However, a secure, centralized repository is required for storing and managing the keys.

The X.500 directory may be used as a repository for storing certificates, associating the public keys of network users with their distinguished name. (An X.500 distinguished name refers to a unique object in the X.500 Directory, and is a sequence of vertex points leading from the "root" of the tree to the object of interest. For example, the distinguished name for "Jane Doe" may be "C=US, O=ATT, CN=Jane Doe," where C[ountry]=US refers to the root of the tree, O[rganization]=ATT is the next branch, and CN=Jane Doe is the leaf node where Jane's directory entry resides.) The X.500 directory can also act as the security agent and provide services that generate and assign authentication certificates to users and other network services.

The X.500 standard defines an authentication framework, known as X.509, for use by OSI applications to provide a basis for authentication and security services. The X.509 authentication framework describes how authentication information is to be held by the directory, how it is obtained, assumptions as to how the authentication information is formed and placed in the directory. The X.509 authentication framework also defines three basic security services: simple authentication, strong authentication, and digital signatures.

Simple authentication is the least secure form of authentication because it involves transmitting unencrypted information. Simple authentication is sometimes used during login to validate user identity before providing access to the system. For example, suppose a user (hereinafter "user1") sends his name and password to a second user (hereinafter "user2"). If a UserPassword attribute type was defined to hold user password information in the X.500 directory, user2 can query the directory to verify that the password it received from user1 matched the one held in the X.500 directory.

Two forms of simple authentication are provided (1) unprotected simple authentication, and (2) protected simple authentication. Unprotected simple authentication involves transmitting the user's name (often the X.500 distinguished name) and a password in clear text. Protected simple authentication involves the application of a one-way hash function on the user's name, password, and a random number and/or time-stamp before transmission. For even greater protection, a second one-way hash function may be applied before transmission.

For example, with protected simple authentication, user1 would append a random number and/or time stamp to his name and password. Before sending it to user2, a one-way hash function is applied on that information, resulting in a "protected token." This "protected token" is then transmitted to user2, with user1's name, random number and/or time stamp. User2 then queries the directory to obtain user1's password, and hashes that copy of the password with user1's name, the random number and/or time stamp just received, and then compares the hash value with the protected token. User1's identity is confirmed if the results of this operation match the protected token.

Figure 4:
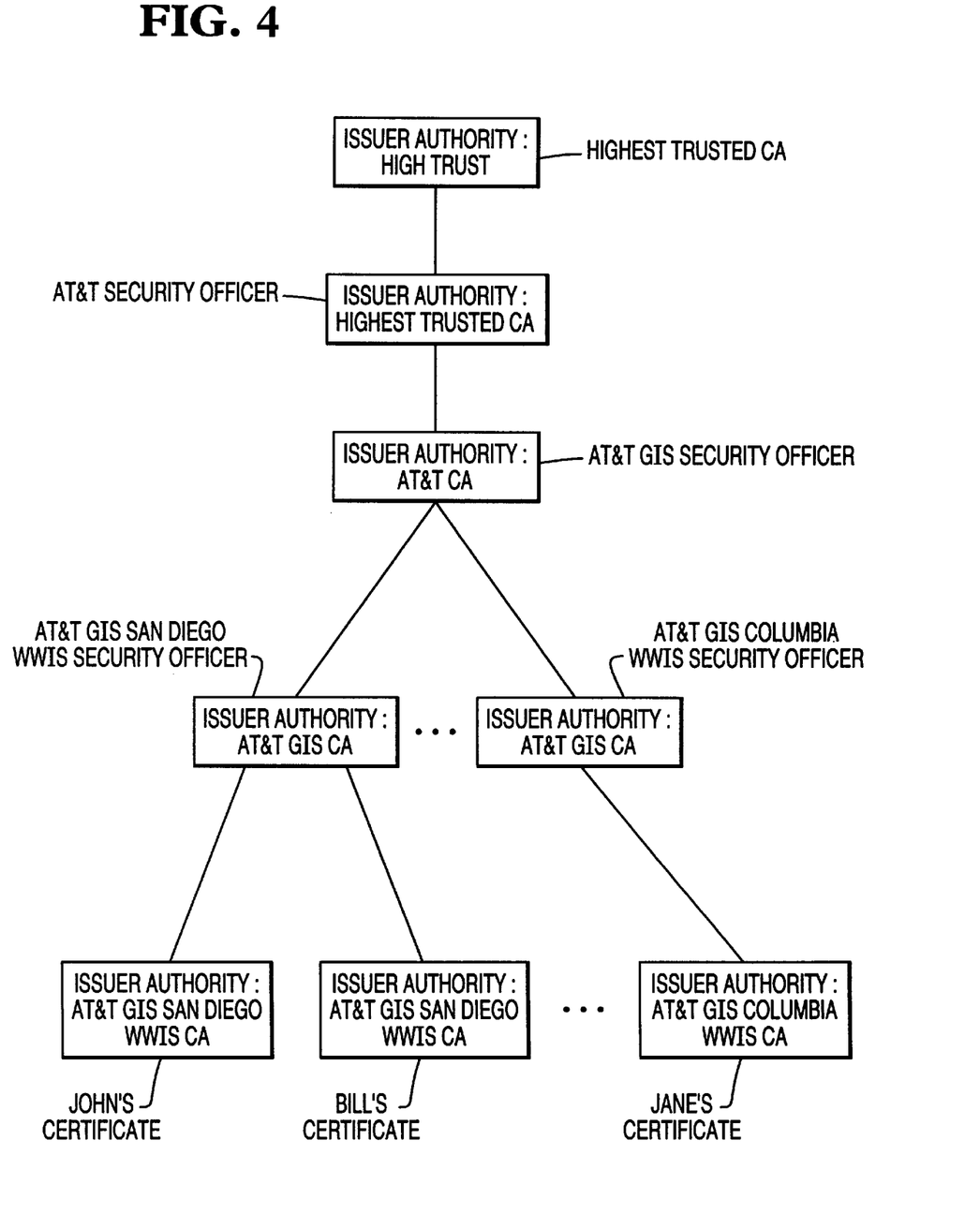
FIG. 4 illustrates a trusted hierarchy of Certificate Authorities.

Strong authentication within the X.509 framework involves the use of public key cryptographic standard (PKCS) and a trusted hierarchy of Certificate Authorities (CAs) as exemplified by FIG. 4. A CA is a trusted source for obtaining a user's authentication information or certificate. This trusted hierarchy is based on an unbroken chain of trusted points in the directory. For example, if the directory user agent (DUA) trusts directory service agent one (DSA1) (a certificate authority), and DSA1 trusts another directory service agent (such as DSA2, for example), then the DUA trusts DSA2.

Strong authentication is established between two points, not end-to-end. Therefore, if the security of DSA1 is compromised, the chain of trust is broken. It is therefore imperative that the directory hierarchy be secure. An illustration of one embodiment of a trusted hierarchy is shown in FIG. 4. In the example shown, Jane can authenticate messages from John by tracing John's certificate back to the AT&T Corporate Security Officer, who Jane has determined is a trusted source.

Authentication information may be exchanged between two parties when an association (or bind) is first established. Three authentication procedures for exchanging authentication information can be used within the X.509 framework: one-way authentication, two-way authentication, and three-way authentication. One-way authentication exchange involves a single transfer of information from a first user to a second user. It establishes the identity of the first user and that the authentication token was generated by the first user. It also establishes an implied identity of the second user as the intended recipient of the authentication token. The authentication token consists of a non-repeating number to detect replay attacks, a time-stamp, and a digital signature. Two-way authentication exchange involves, in addition to the one-way exchange, a reply token transferred from the second user back to the first. This second transfer establishes the identity of the second user with increased reliability. The three-way authentication exchange is similar to the two-way exchange, but involves an additional time stamp transfer from the first user to the second user. This supplements the need for time-stamping the tokens. In each case where strong authentication is to take place, the first user must obtain the public key of the second user or intended recipient of the message from the X.500 directory, and determine the authentication prior to any exchange of information.

Figure 5:
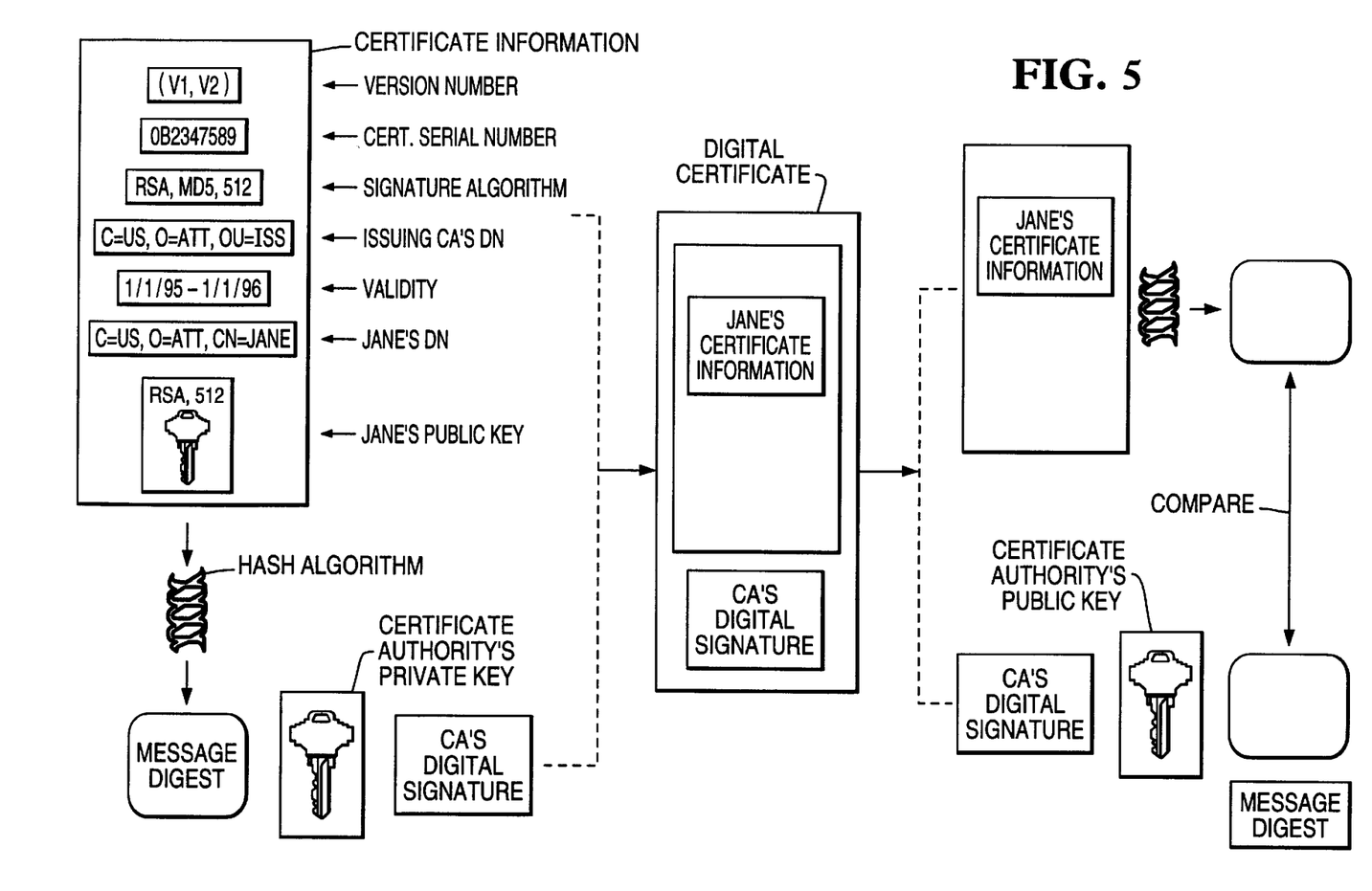
FIG. 5 illustrates authentication of electronic messages using digital certificates issued from a certificate authority.

FIG. 5 provides an overview of how authentication is performed with digital certificates. These digital certificates are stored and managed by a certificate authority (CA). The certificate is issued by the CA and signed with the CA's private key. The certificate is a digest of the certificate information encrypted in the certificate authority's private key. When the recipient receives the message, first the CA's public key is used to decrypt the certificate. The certificate information is hashed, using the same digest, and compared with the CA's encrypted digest. A match validates the certificate information, thus authenticating the user's public key.

For the most secure use of authentication, the certificate itself travels with the signed E-mail message. This gives the recipient assurance that the public key of the sender is valid. Often times more than one certificate may be enclosed. A second certificate is used to testify as to the authenticity of the first certificate, and so on. This creates a "hierarchy chain of certificates," with the top level CA being trusted without a certificate from any other CA. The public key of the top-level CA must be well known and widely published. Of course, the more familiar the sender is to the receiver, the less the need for enclosing and verifying certificates. Consequently, a validation scheme whereby the scope of the verification within the hierarchical chain depends on the familiarity of the sender and receiver of the message. The familiarity of the message parties could be determined by many methods, including an ad hoc scheme in which familiarity is measured by the relative hierarchical level of the servicing CAs.

Certificates are held in the directory as attributes contained within the user's directory entry. The directory entry may include the X.500 StrongAuthenticationUser object class, which defines an attribute called a UserCertificate. Or for the CA itself, X.500 may define a CertificateAuthority object class, which could include a variety of attribute types including: CACertificate, CertificateRevocationList, AuthorityRevocationList, and CrossCertificatePair. A UserCertificate attribute is used to store a user's certificate. An exemplary data format for a UserCertificate is presented in Table 1.

A CACertificate attribute is used to store the public key of the user's certificate authority. The RevocationList attributes are used to store the certificates for CAs and users that have been removed and are no longer valid. Finally, the CrossCheckCertificatePair attribute is used to store the public keys of other certification authorities that may be involved in an authentication exchange between two parties.

2. Retrieving X.509 Certificates

Figure 6:
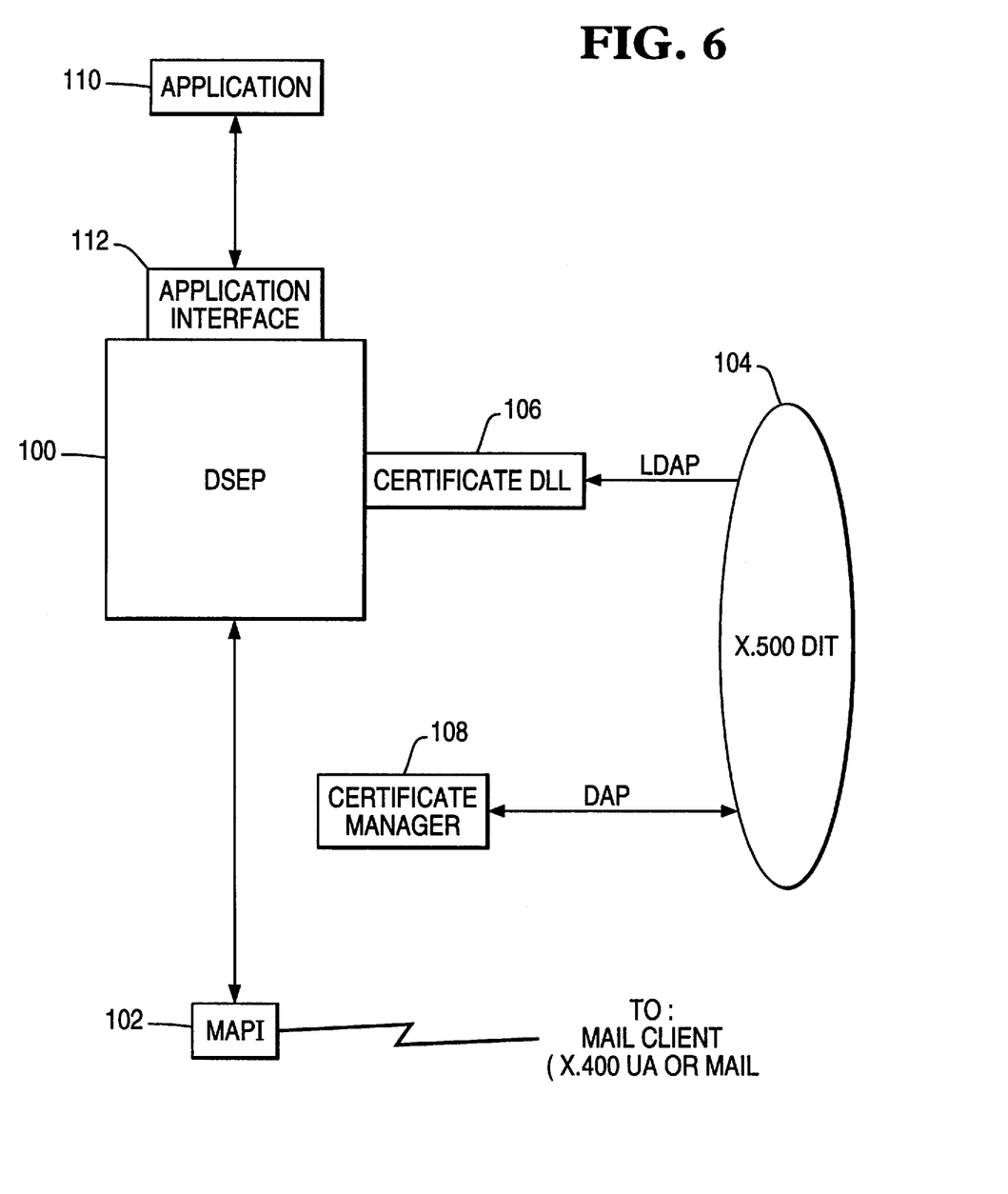
FIG. 6 is a block diagram showing a digital signature and encryption program of the present invention and its associated interfaces.

FIG. 6 is a block diagram showing the use of a digital signature and encryption program (DSEP) (100) to secure and authenticate electronic message transmissions. The DSEP (100) encrypts and decrypts files, provide digital signatures, provide a mail application program interface (to mail and receive encrypted data, and provide the public key to other mail users).

The DSEP (100) can be a stand-alone program, or can function as a utility for an application program resident on the same directory user agent. In the configuration shown, the DSEP (100) is a stand-alone program which accepts commands from other applications (110) via an application interface (112). The DSEP (100) interfaces with a mail user agent or mail client such as X.400 UA or MICROSOFT® Mail via a mail application program interface (MAPI) (102) to mail encrypted data and provide the public key of mail users. The DSEP (100) obtains X.509 certificates from the X.500 directory (104) via a Certificate Dynamic Link Library (DLL) (106). In the preferred embodiment, the Certificate DLL directory user agent interfaces with the X.500 directory according to the light directory access protocol (LDAP).

X.509 certificates are created by the certificate manager (108). Once created, the certificate manager (108) also provides X.500 access to store and manage these certificates via a directory access protocol (DAP).

Figure 7:
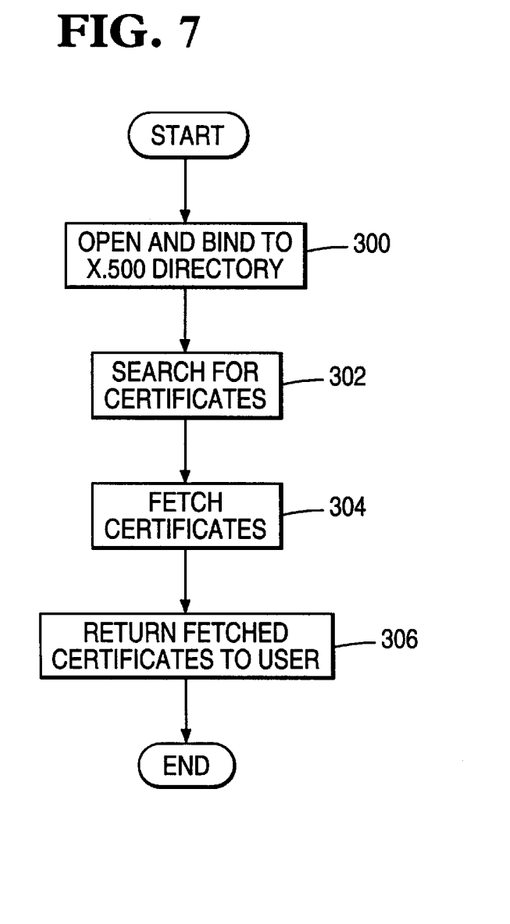
FIG. 7 is a flow chart illustrating the operation of the Certificate Dynamic Link Library of the present invention.

FIG. 7 is a flow chart illustrating the operation of the Certificate DLL (106). In response to a user command which comprises the directory service agent machine name and associated security level, the Certificate DLL (106) opens and binds to an X.500 directory (300) on one or more directory service agents. The user command may also optionally include other factors such as a specified binding time limit, search criteria, or other parameters.

Figure 8:
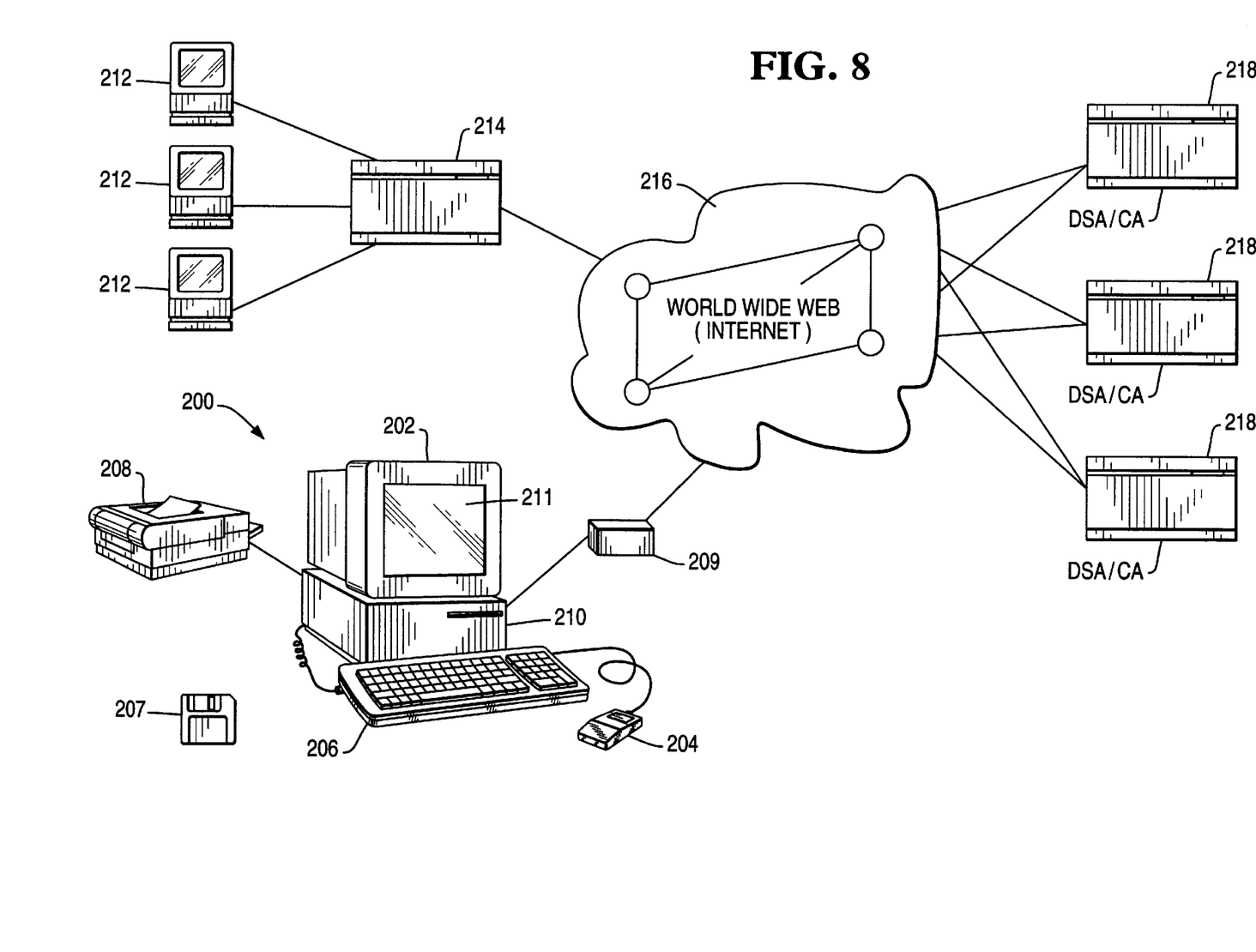
FIG. 8 is diagram illustrating one implementation of the present invention.

The process illustrated in FIG. 7 and FIGS. 9–13 may be performed by a directory user agent implemented in a computer (200) as depicted in FIG. 8 or similar device. The computer (200) includes a display device (202) for displaying data on the display screen (211), a mouse (204) and a keyboard (206) for accepting inputs from the user. The computer (200) may optionally also include a printer (208) for printing hard copies of data or instructions, and disk storage (210) which accepts a program storage device (207).

The computer (200) communicates with other devices, or a network service provider (216) via a modem (209) or other communications interface device. The network service provider (216) is also in communication with other network service users (212) either directly, or through a local area network server (214). Directory service agents (DSAs) such as certificate authorities (CAs) implemented on computer/servers (218) are also in communication with the network service provider (216). Those skilled in the art will recognize that the present invention is not limited to the implementation described in FIG. 8, but can be practiced with any system providing communications between a directory user agent and a directory service agent with access to message certifying information.

Figure 9:
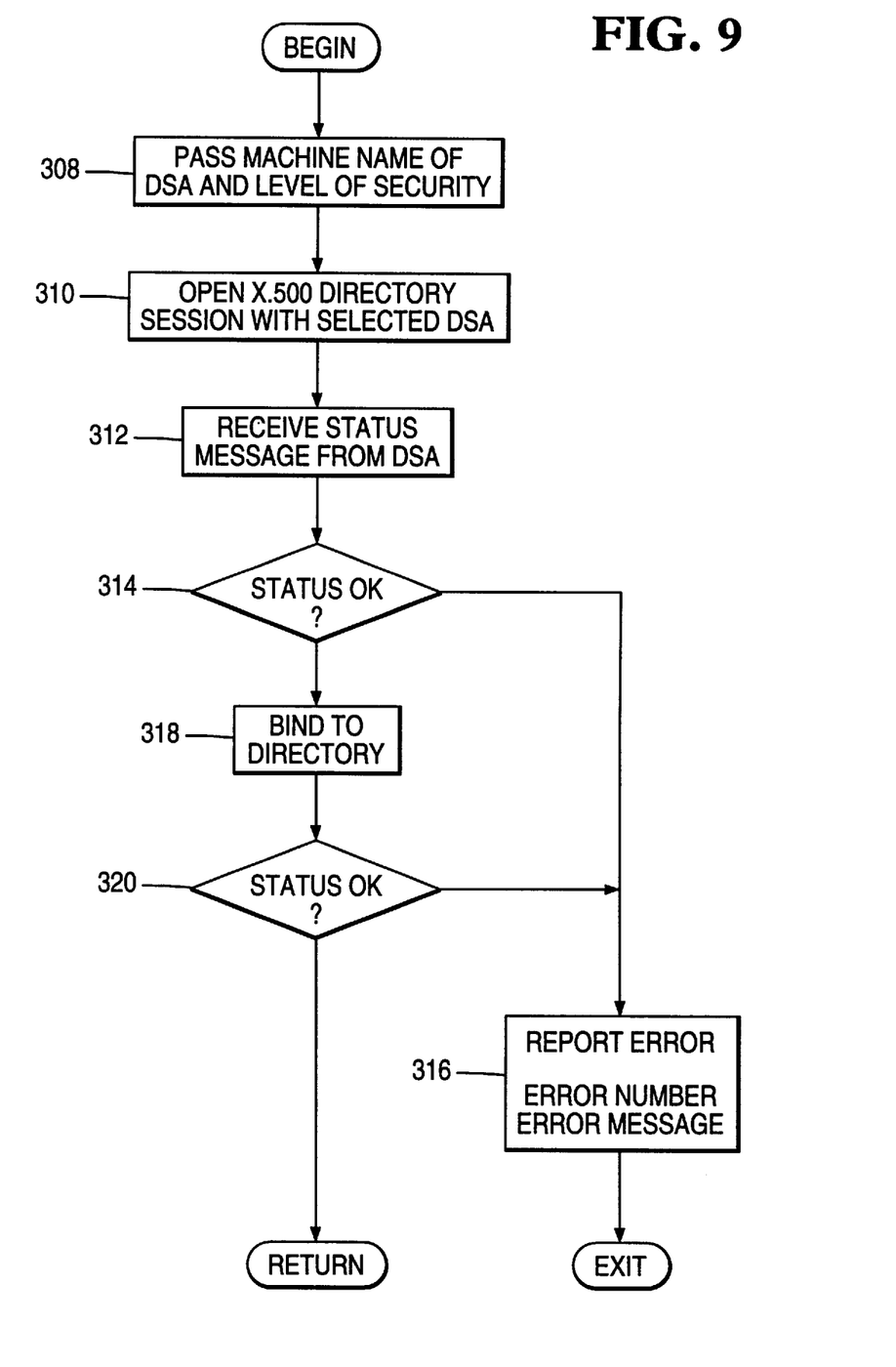
FIG. 9 is a flow chart illustrating the process of opening and binding to an X.500 dictionary.
Figure 10:
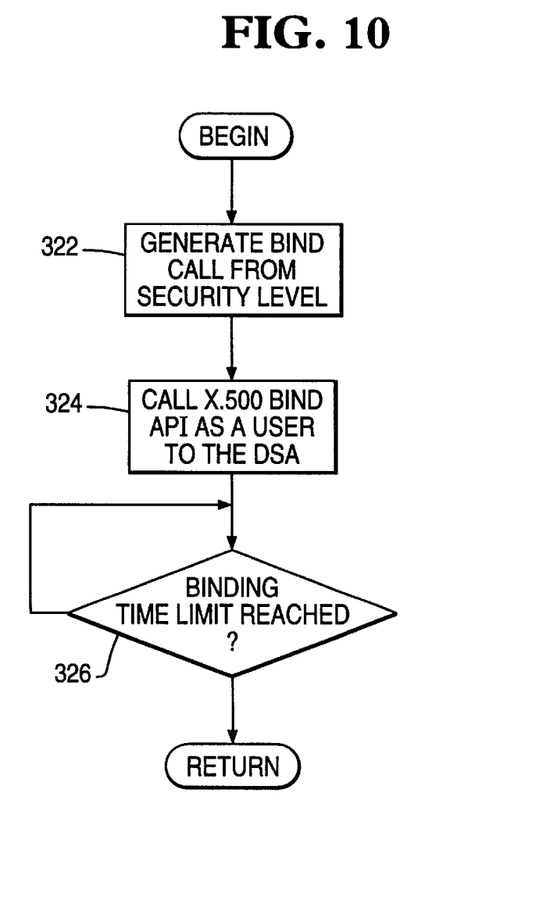
FIG. 10 is a flow chart further illustrating the process of binding to an X.500 directory.

The process of opening and binding (300) to an X.500 directory is shown in greater detail in FIG. 9. The process of opening and binding to an X.500 directory begins with the passing of the machine name of the selected DSA and the level of security (308). Thereafter, an X.500 directory session is opened (310) with the selected DSA by sending a message to the DSA to open the connection. The DSA sends a status message which is received (312) by the DUA. If the returned status is normal (314), the X.500 directory is bound (318) to the session. If not, an error is reported (316) to the DUA. If the session is successfully bound (320) to the X.500, the session proceeds. Otherwise, an appropriate error message is reported (316) to the DUA. The process of binding to the directory (318) is further described in FIG. 10. This process entails generating (322) a bind call from the appropriate security level and calling (324) the X.500 bind API as a user to the DSA. Provision is made to limit the binding time (326) to an acceptable value. If the binding time exceeds this value, an error message is generated, and the process is suspended. Referring back to FIG. 7, after the X.500 directory is opened and successfully bound to, it is searched (302) for certificates.

Figure 11:
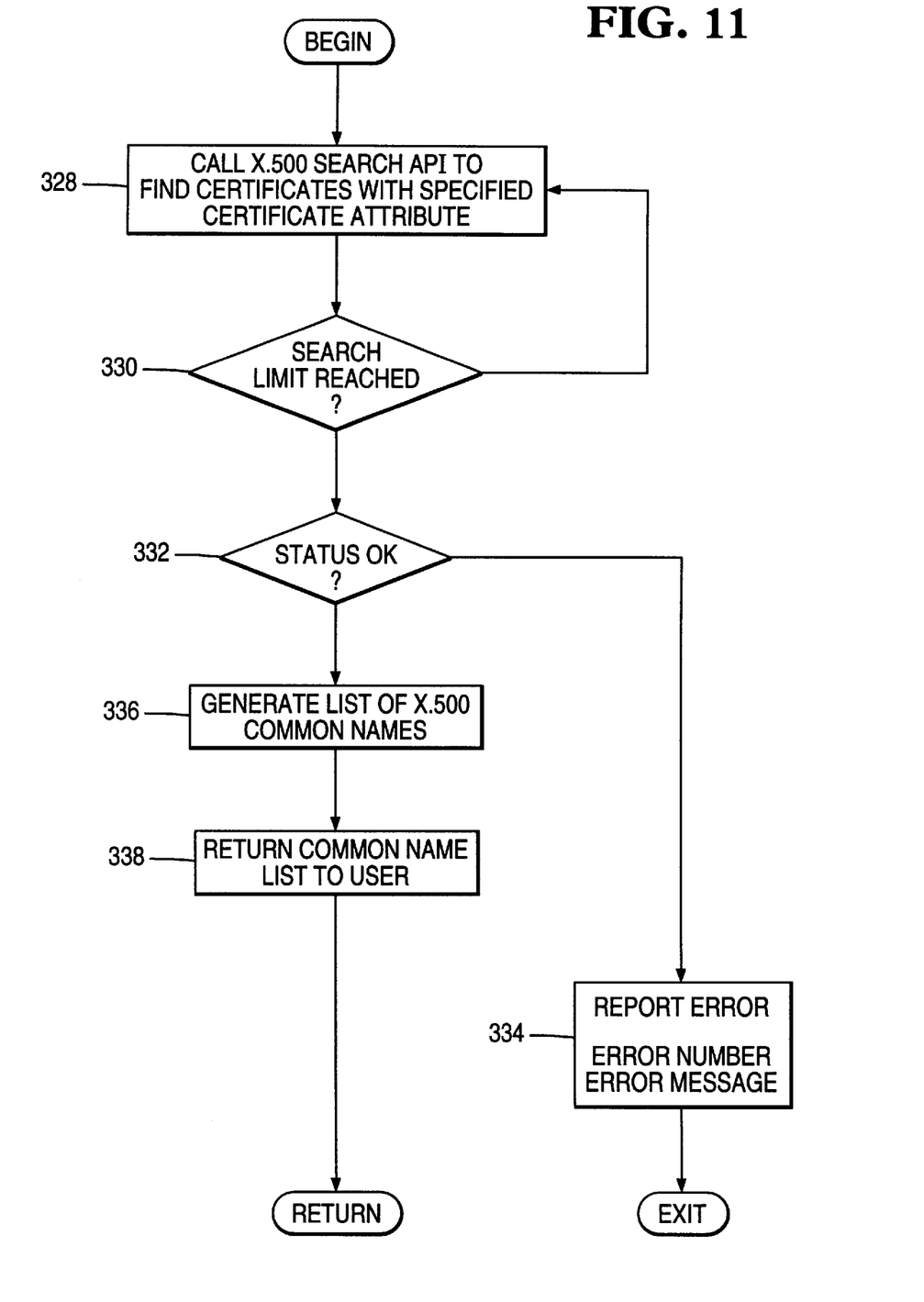
FIG. 11 is a flow chart illustrating the process of searching an X.500 dictionary for certificates.

FIG. 11 is a flow chart showing how the X.500 directory is searched for certificates. First, an X.500 API is called (328) to find certificates. As described above, certificates may possess a number of attributes. Although not required to practice the present invention, the X.500 API may limit the certificate search to those certificates with one or more specified attributes, possibly in a variety of combinations.

As previously described, the user or application, through the DSA, can specify a search limit. If this feature is implemented, the certificate search is terminated when the search limit (330) is reached. Thereafter, a list of X.500 CommonNames responsive to the search results is generated (336), and returned (338) to the user for selection. It is within the scope of the present invention for the DSA or application to select from a list of CommonNames without further intervention by the user, by either supplying the entire CommonName list responsive to the search, or by applying pre-selected selection criteria. Finally, if the X.500 search API returns an error status, this result is reported (334). Returning to FIG. 7, after the search for certificates (302), the certificates are fetched (304) and returned to the user (306).

Figure 12:
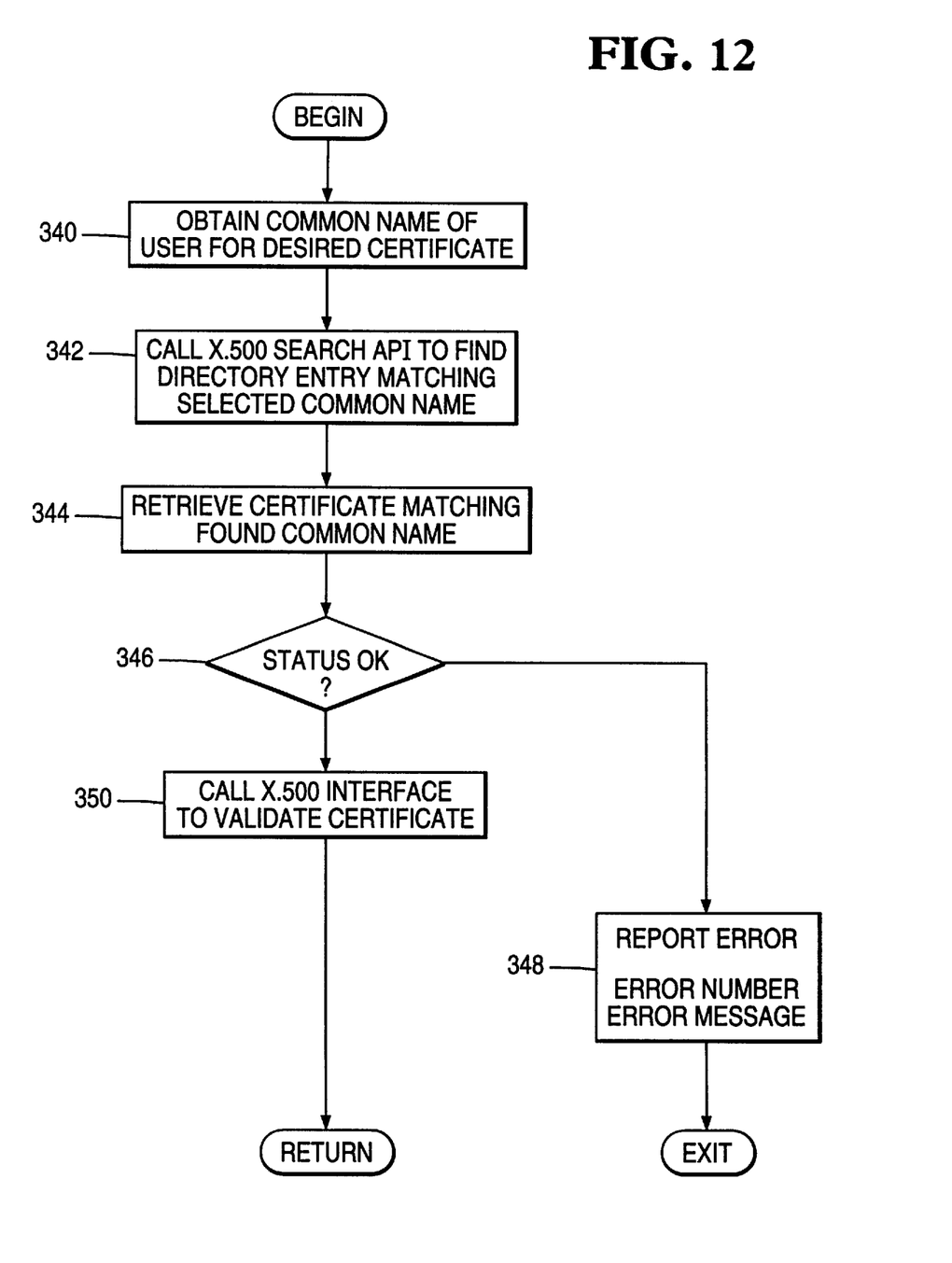
FIG. 12 is a flow chart illustrating the process of fetching certificates.

FIG. 12 is a flow chart illustrating how selected certificates are fetched (304) from the X.500 directory. First, an X.500 search API is called (342) to find directory entries matching the selected CommonNames. Certificates matching the found CommonNames are retrieved (344), and if no status errors arise (346), the retrieved certificates are validated (350) by calling an X.500 API interface. If status errors arise, they are reported (348) to the DUA.

Figure 13:
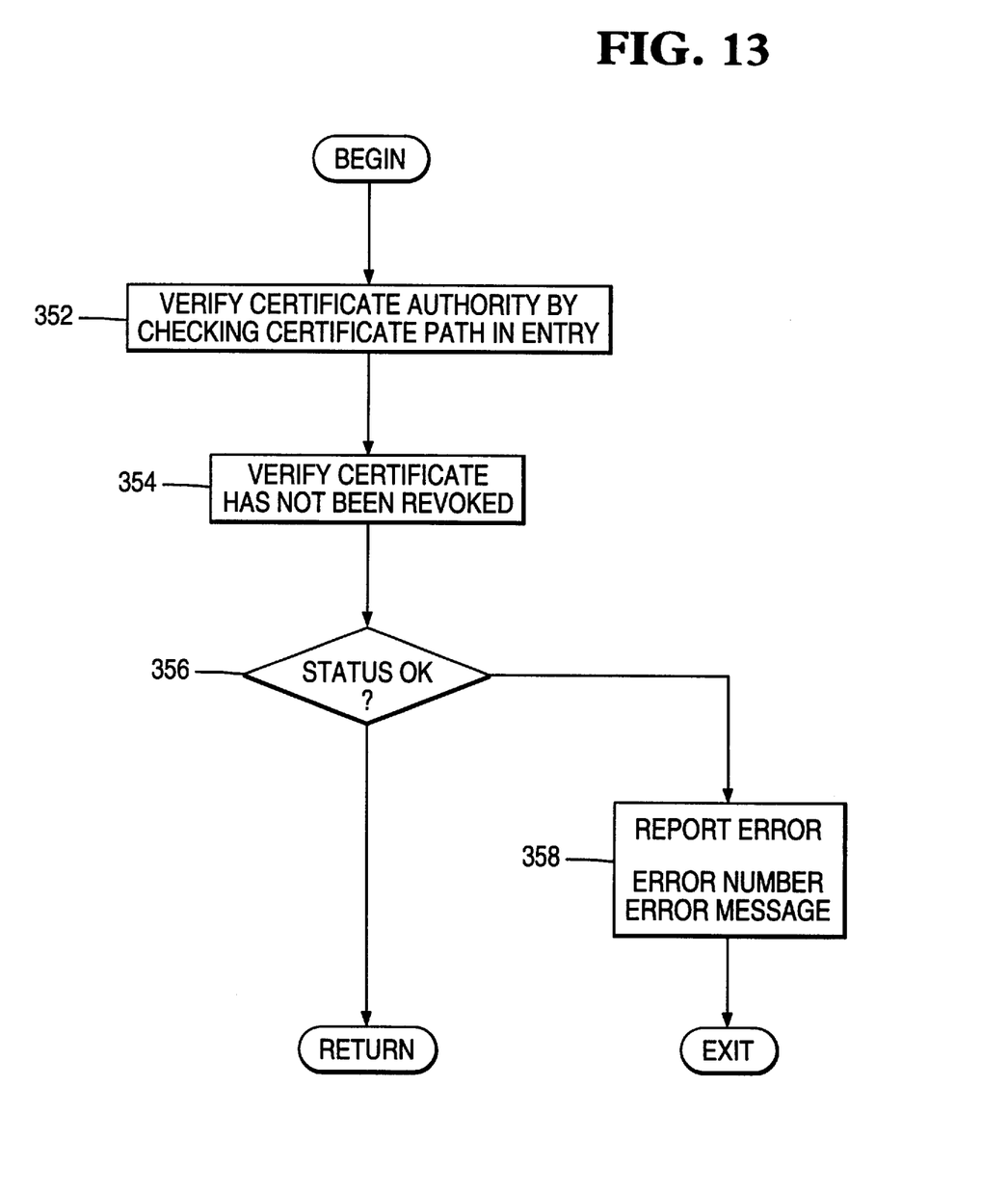
FIG. 13 is a flow chart illustrating the process of validating fetched certificates.

FIG. 13 is a flow chart illustrating how certificates are validated. This process includes the step of verifying (352) the certificate authority by checking the certificate path in the entry in the CA hierarchical structure. Thereafter, the certificate is further verified (354) by accessing revocation attributes, such as the CertificationRevocation or AuthorityRevocation lists described earlier, and checking to assure that the certificate or the certifying authority are not on the respective revocation lists. Then, another status check is performed (356). If the status is O.K., the valid fetched certificates are returned (306) to the user, allowing the authentication and security methods described herein to proceed. If the status check is not O.K., the error is reported (358) to the DUA.

CONCLUSION

This concludes the description of the preferred embodiment of the invention. In summary, the present invention discloses a method and apparatus for retrieving an authentication certificate from a directory accessible by a directory service agent. The method comprises the steps of transmitting an open connection message to establish communication between the directory user agent and the directory service agent, searching the directory for authentication certificates, fetching the authentication certificates, and transmitting the fetched authentication certificates to the directory user agent. In one embodiment, the method further comprises the steps of searching the directory for authentication certificates responsive to search criteria defining certificate attributes.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

| UserCertificate: | ::= | SIGNED SEQUENCE { |
|---|---|---|
| Version | | [0]  VersionDEFAULTv1988, |
| serialNumber | | CertificateSerial Number, |
| signature | | AlgorithmIdentifier, |
| issuer | | Name, |
| validity | | Validity, |

TABLE 1-continued

```
subject                      Name,
subjectPublicKeyInfo         SubjectPublicKeyInfo,
issuerUniqueIdentifier       [1] IMPLICIT BIT STRING OPTIONAL,
                             --if present, version must be V2--
subjectUniqueIdentifier      [2] IMPLICIT BIT STRING OPTIONAL,
                             --if present, version must be V2-- }
extensions                   --Proposed extensions for V3--
Version              : : =   INTEGER    {v1 (0), v2 (1) }
CertificateSerialNumber : : = INTEGER
Validity             : : =   SEQUENCE {
                                 notBefore    UTCTime,
                                 notAfter     UTCTime}
SubjectPublicKeyInfo : : =   SEQUENCE {
                                 algorithm       AlgorithmIdentifier
                                 subjectPublicKey  BIT STRING}
AlgorithmIdentifier  : : =   SEQUENCE {
                                 algorithm    OBJECT IDENTIFIER,
                                 parameters   ANY DEFINED BY algorithm
                                              OPTIONAL}
```

What is claimed is:

1. A method of retrieving an authentication certificate from a directory accessible by a directory service agent in a directory user agent, comprising the steps of:

transmitting an open connection message comprising a search criteria message including certificate attributes to establish communication between the directory user agent and the directory service agent;

searching the directory for authentication certificates responsive to the search criteria message;

fetching the authentication certificates; and transmitting the fetched authentication certificates to the directory user agent.

2. The method of claim 1 wherein the step of searching the directory for authentication certificates comprises the step of invoking a search application program interface to retrieve the certificates responsive to the search criteria message.

3. The method of claim 2 wherein the search application program interface resides in the directory user agent.

4. The method of claim 2 wherein the search application program interface resides in the directory service agent.

5. The method of claim 1 wherein each authentication certificate is associated with a name and the step of searching the directory for authentication certificates further comprises the steps of:

generating a list of names associated with certificates responsive to the search criteria message; and presenting the names list to a user.

6. The method of claim 1 wherein the step of fetching the certificates comprises the steps of:

invoking a search application program interface to retrieve certificates; and validating the retrieved certificates.

7. The method of claim 6 wherein the step of validating the certificates comprises the step of verifying that a certificate has not been revoked by accessing a certificate revocation list maintained by the directory service agent.

8. The method of claim 6 wherein the directory is accessible to a plurality of directory service agents, said directory service agents in communication with each other and arranged in a hierarchical relationship, and the step of validating the certificates comprises the step of verifying the certificate authority, including the steps of:

accessing a plurality of directory service agents at different hierarchical levels;

obtaining certificates from each of the plurality of directory service agents; and comparing the certificates obtained from the plurality of directory service agents.

9. An apparatus for retrieving an authentication certificate from a directory accessible by a directory service agent in a directory user agent comprising:

a computer implementing the directory user agent communicatively coupled to the directory service agent;

means, performed by the computer, for transmitting an open connection message comprising a search criteria message including certificate attributes to establish communication between the directory user agent and the directory service agent;

means, performed by the computer, for searching the directory for authentication certificates responsive to the search criteria message;

means, performed by the computer, for fetching the authentication certificates; and means, performed by the computer, for transmitting the fetched authentication certificates to the directory user agent.

10. The apparatus of claim 9 wherein the means for fetching further comprises means, performed by the computer, for invoking a search application program interface to retrieve the certificates responsive to the search criteria message.

11. The apparatus of claim 10 wherein the search application program interface resides in the directory user agent.

12. The apparatus of claim 10 wherein the search application program interface resides in the directory service agent.

13. The apparatus of claim 9 wherein each authentication certificate is associated with a name and the means for searching the directory for the authentication certificates further comprises:

means for generating a list of names associated with the certificates further comprises:

means for generating a list of names associated with certificates responsive to the search criteria message; and means for presenting the names to a user.

14. The apparatus of claim 9 wherein fetching means comprises:

means for invoking a search application program interface to retrieve certificates; and means for validating the retrieved certificates.

15. The apparatus of claim 14 wherein the means validating means comprises means for validating that a certificate has not been revoked by accessing a certificate revocation list maintained by the directory service agent.

16. The apparatus of claim 14 wherein the directory is accessible to a plurality of directory service agents, said directory service agents in communication with each other and arranged in a hierarchical relationship, and the validating means comprises a means for validating the authenticity of the directory service agent, including:

means for accessing a plurality of directory service agents at different hierarchical levels;

means for obtaining certificates from each of the plurality of directory service agents; and means for comparing the certificates obtained from the plurality of directory service agents.

17. A program storage device, readable by a computer, tangibly embodying one or more programs of instructions executable by the computer to perform one or more programs of instruction executable by the computer to perform method steps of retrieving an authentication certificate from a directory accessible by a directory service agent in a directory user agent, the method steps comprising the steps of:

transmitting an open connection message comprising a search criteria message including certificate attributes to establish communication between the directory user agent and the directory service agent;

searching the directory for authentication certificates responsive to the search criteria message;

fetching the authentication certificates; and transmitting the fetched authentication certificates to the directory user agent.

18. The program storage device of claim 17, wherein the method step of searching the directory for authentication certificates comprises the method step of invoking a search application program interface to retrieve the certificates responsive to the search criteria message.

19. The program storage device of claim 17 wherein the method step of fetching the certificates comprises the method steps of:

invoking a search application program interface to retrieve certificates; and validating the retrieved certificates.

20. The program storage device of claim 19 wherein the directory is accessible to a plurality of directory service agents, said directory service agents in communication with each other and arranged in a hierarchical relationship, and the step of validating the certificates comprises the method steps of:

verifying that the certificate has not been revoked by accessing a certificate revocation list maintained by the directory service agent; and verifying the certificate authority, including the method steps of accessing a plurality of directory service agents at different hierarchical levels, obtaining certificates from each of the plurality of directory service agents and comparing the certificates obtained from the plurality of directory service agents.

21. The method of claim 1, wherein the step of transmitting an open connection message to establish communication between the directory user agent and the directory service agent comprises the steps of opening and binding a certificate data link library to the directory service agent.

22. The method of claim 1, wherein the open connection message further comprises a search limit and the directory is searched for authentication certificates until the search limit is reached.

23. The method of claim 1, wherein the open connection message comprises a directory service agent name and an associated security level, and the certificate data link library is bound to the directory service agent by generating a bind call from the security level and calling a bind application program interface as a user to the directory service agent.

24. The method of claim 21, wherein the open connection message comprises a binding time value, and the method further comprises the steps of suspending binding if the binding time exceeds the binding time value.

25. The apparatus of claim 9, wherein the means for transmitting an open connection message to establish communication between the directory user agent and the directory service agent comprises a means for opening and binding a certificate data link library to the directory service agent.

26. The apparatus of claim 9, wherein the open connection message further comprises a search limit and the directory is searched for authentication certificates until the search limit is reached.

27. The apparatus of claim 9, wherein the open connection message comprises a directory service agent name and an associated security level, and the certificate data link library is bound to the directory service agent by generating a bind call from the security level and calling a bind application program interface as a user to the directory service agent.

28. The apparatus of claim 25, wherein the open connection message comprises a binding time value, and the method further comprises the steps of suspending binding if the binding time exceeds the binding time value.

29. The program storage device of claim 17, wherein the method step of transmitting an open connection message to establish communication between the directory user agent and the directory service agent comprises the method steps of opening and binding a certificate data link library to the directory service agent.

30. The program storage device of claim 17, wherein the open connection message further comprises a search limit and the directory is searched for authentication certificates until the search limit is reached.

31. The program storage device of claim 17, wherein the open connection message comprises a directory service agent name and an associated security level, and the certificate data link library is bound to the directory service agent by generating a bind call from the security level and calling a bind application program interface as a user to the directory service agent.

32. The program storage device of claim 29, wherein the open connection message comprises a binding time value, and the method further comprises the steps of suspending binding if the binding time exceeds the binding time value.

* * * * *